(12) United States Patent
Zuili

(10) Patent No.: US 6,633,901 B1
(45) Date of Patent: Oct. 14, 2003

(54) MULTI-ROUTE CLIENT-SERVER ARCHITECTURE

(75) Inventor: Patrick Zuili, Issy les Moulineaux (FR)

(73) Assignee: PSS Systems, Inc., Palo Alto, CA (US)

( * ) Notice: Subject to any disclaimer, the term of this patent is extended or adjusted under 35 U.S.C. 154(b) by 0 days.

(21) Appl. No.: 09/425,382

(22) Filed: Oct. 22, 1999

Related U.S. Application Data

(60) Provisional application No. 60/105,362, filed on Oct. 23, 1998.

(51) Int. Cl.$^7$ ................................................ G06F 15/16
(52) U.S. Cl. ...................... 709/203; 709/201; 709/202; 709/238; 709/232; 707/10; 711/144; 711/156; 711/165; 713/201
(58) Field of Search ................................ 709/202, 203, 709/238, 213, 229, 219, 226, 232, 230, 231; 713/201; 707/10, 1, 202; 711/144, 165, 156; 714/27

(56) References Cited

U.S. PATENT DOCUMENTS

| | | | | |
|---|---|---|---|---|
| 5,765,028 A | * | 6/1998 | Gladden ........................ 706/25 |
| 5,864,854 A | * | 1/1999 | Boyle ........................... 707/10 |
| 5,878,218 A | * | 3/1999 | Maddalozzo et al. ........ 709/213 |
| 5,884,031 A | | 3/1999 | Ice ......................... 395/200.33 |
| 5,946,464 A | * | 8/1999 | Kito et al. .................... 709/202 |
| 6,003,030 A | | 12/1999 | Kenner et al. ................ 707/10 |
| 6,012,083 A | * | 1/2000 | Savitzky et al. .............. 709/202 |
| 6,049,821 A | * | 4/2000 | Theriault et al. ............. 709/203 |
| 6,141,759 A | * | 10/2000 | Braddy ......................... 713/201 |
| 6,212,520 B1 | * | 4/2001 | Maruyama et al. ........... 707/10 |
| 6,216,151 B1 | * | 4/2001 | Antoun ......................... 709/203 |
| 6,253,234 B1 | * | 6/2001 | Hunt et al. .................... 707/10 |
| 6,336,115 B1 | * | 1/2002 | Tominaga et al. ............. 707/1 |
| 6,374,289 B2 | * | 4/2002 | Delaney et al. .............. 709/203 |
| 6,490,625 B1 | * | 12/2002 | Islam et al. .................. 709/229 |

* cited by examiner

Primary Examiner—Ayaz Sheikh
Assistant Examiner—Thu Ha Nguyen
(74) Attorney, Agent, or Firm—Joe Zheng

(57) ABSTRACT

A "flat" network architecture facilitates direct connections between nodes so that information may be retrieved more efficiently. Agent software is loaded on each participating node, and this code is sufficiently intelligent to share and relay information appropriately in accordance with user requests. The invention is particularly advantageous in situations where communication bottlenecks are likely to occur, such as between corporate intranets and the Internet, in conjunction with requests to international servers, and in other configurations wherein only a limited number of data pipelines are available. A method of accessing information in a client-server network architecture according to the invention includes the step of maintaining a database on the server which keeps track of where desired information is stored on the network. When such information is requested from the server, the database is queried to determine whether the information is available from one or more participating clients. If so, the information is provided to the requestor directly through the client(s). According to the invention, this redirection of information is accomplished by storing agent software on each participating client. The agent is operative to inform the server that the client is storing at least a portion of the requested information, such that when the server queries the clients to determine the location of the information, the agents let the server know how much of the requested information they can make available to the requestor. Following this, the information is either provided to the requestor by the server instructing the client to deliver the information directly to the requestor the address of the client is downloaded to the requester, enabling the requestor to link to one or more clients if the information is fragmented across the net.

16 Claims, 4 Drawing Sheets

MULTI-ROUTE CLIENT-SERVER ARCHITECTURE

REFERENCE TO RELATED APPLICATION

This application claims priority from U.S. provisional application Ser. No. 60/105,362, filed Oct. 23, 1998, the entire contents of which are incorporated herein by reference.

FIELD OF THE INVENTION

This invention relates to the networking and communication of machines or devices, and, in particular, to methods and arrangements for improving and optimizing traffic communication across networks interconnecting such machines and devices.

BACKGROUND OF THE INVENTION

Problems associated with computer network congestion have increased significantly in recent years. One cause of network congestion is inefficient routing topology. For example, if client A and client B live next door to each other and both need to access the same information stored on a server in Japan, both users must send identical requests to the server in Japan, and the server sends identical copies of the requested information to both clients. This effectively doubles the amount of bandwidth needed to service the two requests compared with client A requesting and receiving the information from Japan and client B requesting and receiving the information from client A.

This problem has a significant impact on both local-area and wide-area networks (LANs and WANs). If client A and client B are inside a LAN and request the same information outside the LAN, both issue identical requests, and force duplicated information to be sent through the LAN connections to the external world. This increases bandwidth usage on the external connection, increases processing loads on firewalls, routers, and proxy servers, and consequently increases the time to access the required information.

U.S. Pat. No. 5,884,031 attempts to solve this using a hierarchal topology wherein parent and child nodes are each responsible for passing information to child nodes. As such, child nodes may be disconnected from the data source if key parent computers are turned off, removed from the network, or disabled. The design of the '031 patent also makes poor use of bandwidth and CPU resources because data is rebroadcast by each node to its children nodes, whether or not its child node actually needs the information. Accordingly, there is an outstanding need for a network architecture that makes more efficient use of computer resources and bandwidth.

SUMMARY OF THE INVENTION

This invention solves problems associated with prior-art approaches by providing a "flat" network architecture facilitating direct connections between computers and other machines and devices so that information may be retrieved more efficiently. In the preferred embodiment, agent software is loaded on each participating node, and this inventive software is sufficiently intelligent to share and relay information appropriately in accordance with user requests.

The invention is particularly advantageous in situations where communication bottlenecks are likely to occur, such as between corporate intranets and the Internet, in conjunction with requests to international servers, and in other configurations wherein only a limited number of data pipelines are available.

A method of accessing information in a client-server network architecture according to the invention includes the step of maintaining a database on the server which keeps track of where desired information is stored on the network. When such information is requested from the server, the database is queried to determine whether the information is available from one or more participating clients. If so, the information is provided to the requestor directly through the client(s).

According to the invention, this redirection of information is accomplished by storing agent software on each participating client. The agent is operative to inform the server that the client is storing at least a portion of the requested information, such that when the server queries the clients to determine the location of the information, the agents let the server know how much of the requested information they can make available to the requestor. Following this, the information is either provided to the requestor by the server instructing the client to deliver the information directly to the requestor or the address of the client is downloaded to the requester, enabling the requestor to link to one or more clients if the information is fragmented across the network.

The invention is not limited in terms of protocol or network topology. The named client and server machines can provide any conventional network services. To help ensure that requested information remains up-to-date, the server may keep track of clients cashing the information on a last-in, first-out basis. Nor is the invention limited in terms of its applicability to general-purpose computers, and may be used with telephones, personal communication devices, personal digital assistance, work stations, and other types of machines and devices, particularly when such machines and devices are interconnected to a local-area or wide-area network, whether through a physical or wireless communication infrastructure. Generally speaking, the invention is applicable to any type of system wherein otherwise scarce resources need to be optimized among participating devices or machines, or wherein participants would benefit from the optimization of resources used to enhance switching communication and/or performance.

DETAILED DESCRIPTION OF THE INVENTION

The drawings illustrate a client-server architecture according to the invention for locally caching shared information in a TCP/IP network. Note that the client and server terminology is used only for the description of this architecture and does not require or imply a specific network functionality. The named client and server machines can provide any conventional network services.

Figure 1:
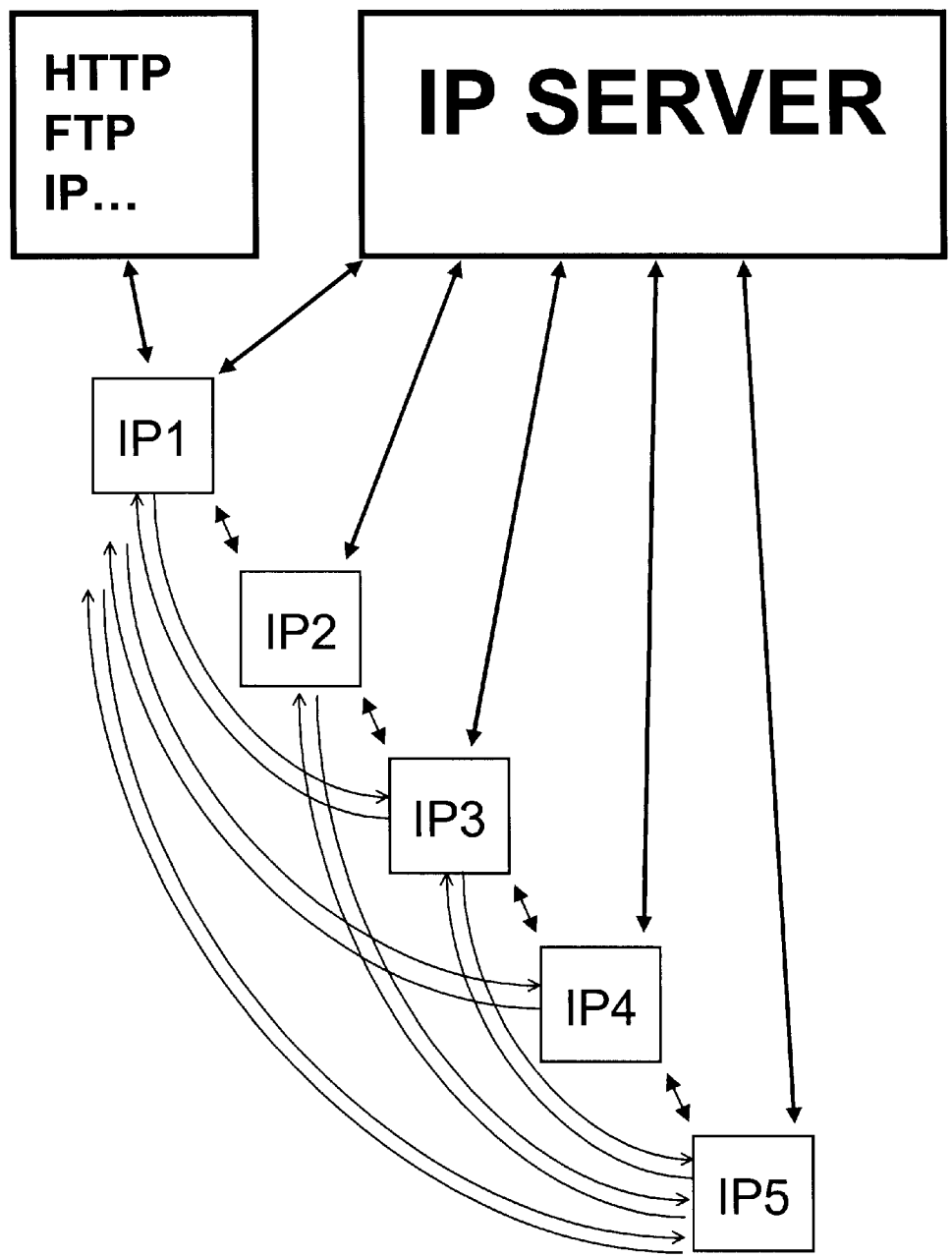
FIG. 1 is a drawing which depicts a configuration wherein multiple clients have been added to a network to which the principles of this invention are applicable.

FIG. 1 depicts five clients that have been added to the network in compliance with an architecture adhering to the principles of this invention. Each client, named IP1 through IP5, is provided with a software agent that registers its IP address with the IP database, and informs the IP database that is a connected participant. The IP database keeps a registry of IP addresses of all of the participating clients.

In FIG. 1, IP1 issues a request for information "A" via web browser, ftp software, etc. If the requested information is not stored on the client's machine, or any machine on the network, it downloads the information and stores the information in its local cache for the required use.

Figure 2:
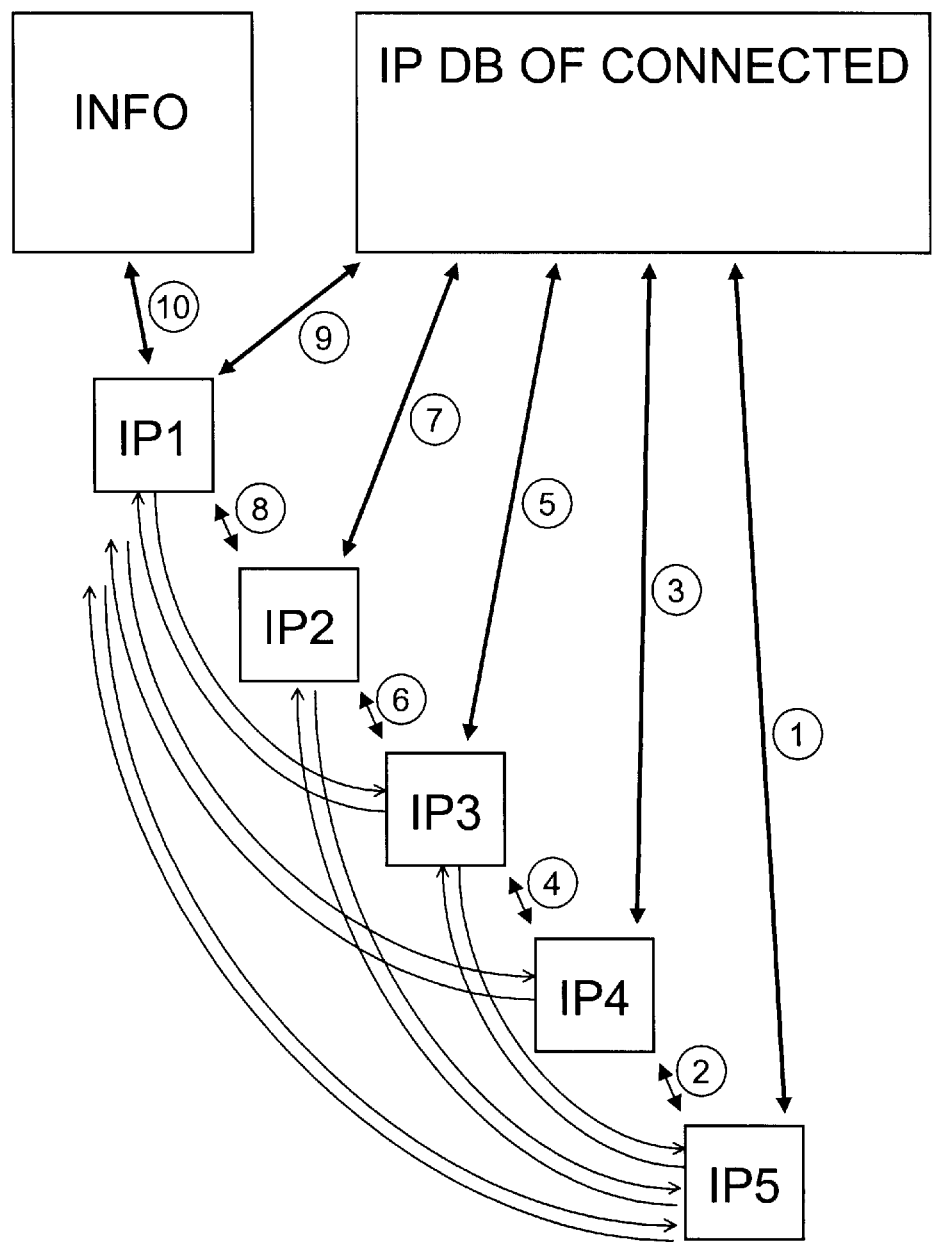
FIG. 2 is a drawing which shows how a request for information is handled according to the invention.

In FIG. 2, IP3 issues a request for information "A," which is the same information IP1 previously requested and stored in its cache. The client-agent stored on IP3 now makes a request to the IP database for the information "A". The IP database broadcasts the request for information "A" to the participating client-agents. Because IP1 has information "A," it will notify the IP database that it does have the requested information.

At this point, the IP database notifies IP3 that IP1 has information "A" cached, and will pass on required information, such as the IP address of IP1, to IP3 so that IP3 can conduct direct negotiations with IP1 for information "A." IP1 will then send the information to IP3.

It may arise that IP3 needs more information than just information "A," or that information "A" itself may be fragmented, with different portions of information "A" being cached on different machines across the net. When IP3 requests the desired information, the participating client-agents provide information on the pieces of the information they have cached. This information is returned to IP3 who, as the requester of information, knows the size and extent of the fragmentation and negotiates with the other client-agents to request the fragmented parts of the information and rebuild the information it needs.

IP3, now having a direct connection with each client-agent on the network, has information on latency and bandwidth between itself and its peer machines. If different client-agents have redundant information, IP3 uses this information calculate the optimal retrieval method. For example, to request all of the information from the "closest" computer, or to request different sizes of information from different computers, depending on the network connections for those machines.

The architecture provides for multiple client agents. After registration with the IP database, each client is responsible for handling requests from the network application. For each request for information, the agent checks its own cache, checks the cache of other client-agents through the IP database, or retrieves the requested information from its source as a last resort. The hierarchy of information retrieval methods moving from fastest to slowest gives client machines fastest possible access to information while using minimal bandwidth.

Figure 3:
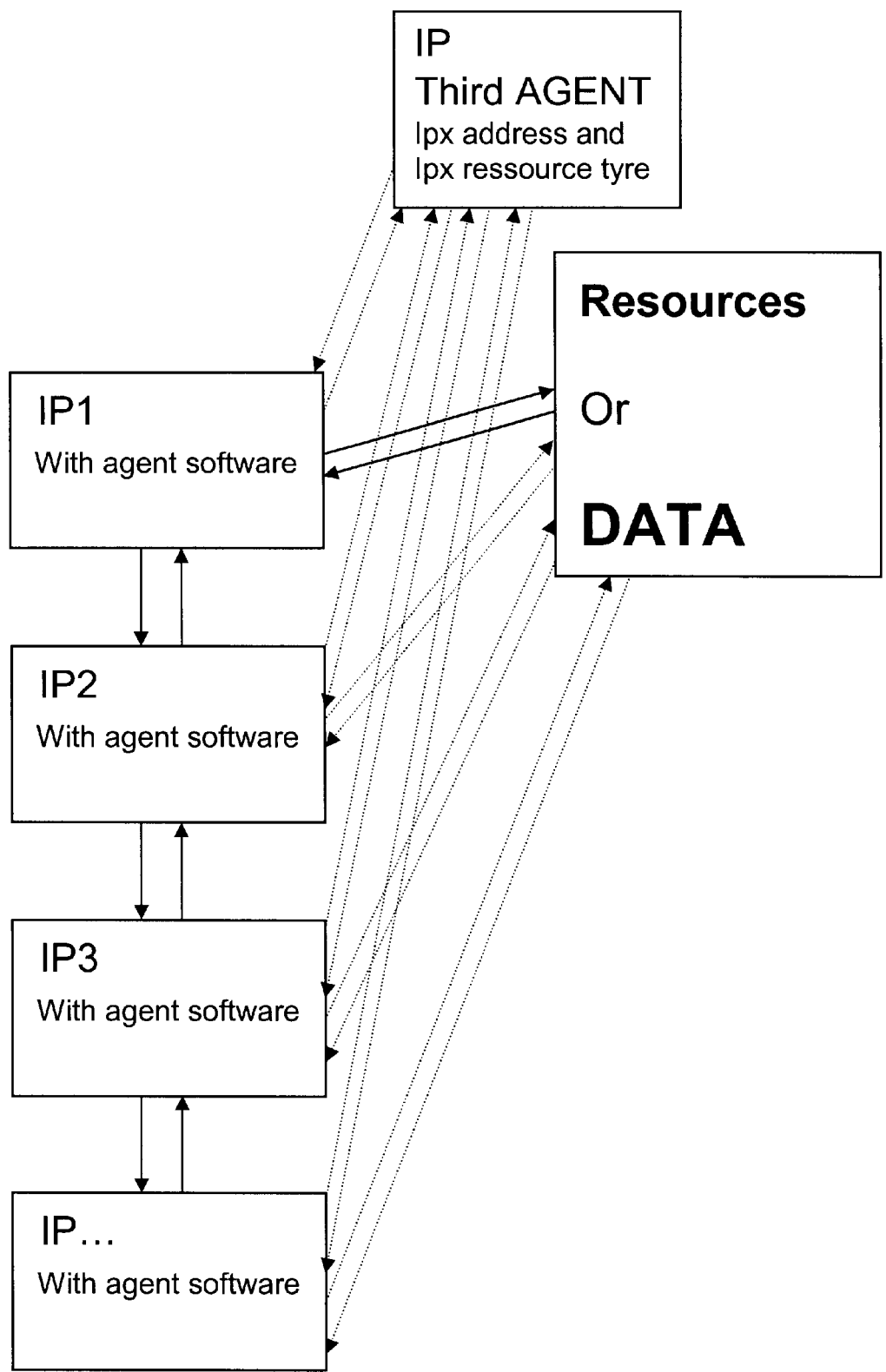
FIG. 3 depicts agent software acting as an interface between a network application and network interface hardware.

The software agents reside on the network application layer or directly underneath the network application layer. Any network application, such as web browsers and ftp clients, can interface with the software agent to provide the network application's requested information. FIG. 3 shows the agent software acting as an interface between the network application and the network interface hardware. The network application does not access information directly from the network, but relies on the software agent to provide the requested information. The architecture encapsulates the processes of the agent so that network applications do not have to manage their own cache or network interface.

The software agents can be installed via network installation or other conventional methods. The software agent runs as a daemon whenever the computer is turned on and connected to a network. The software agent is also a multi-threaded process that is able to handle multiple requests, negotiations, and network applications. Using this architecture, the Internet and any TCP/IP network becomes a flattened network of vectors between autonomous and intelligent agents managing information traffic on the network.

Figure 4:
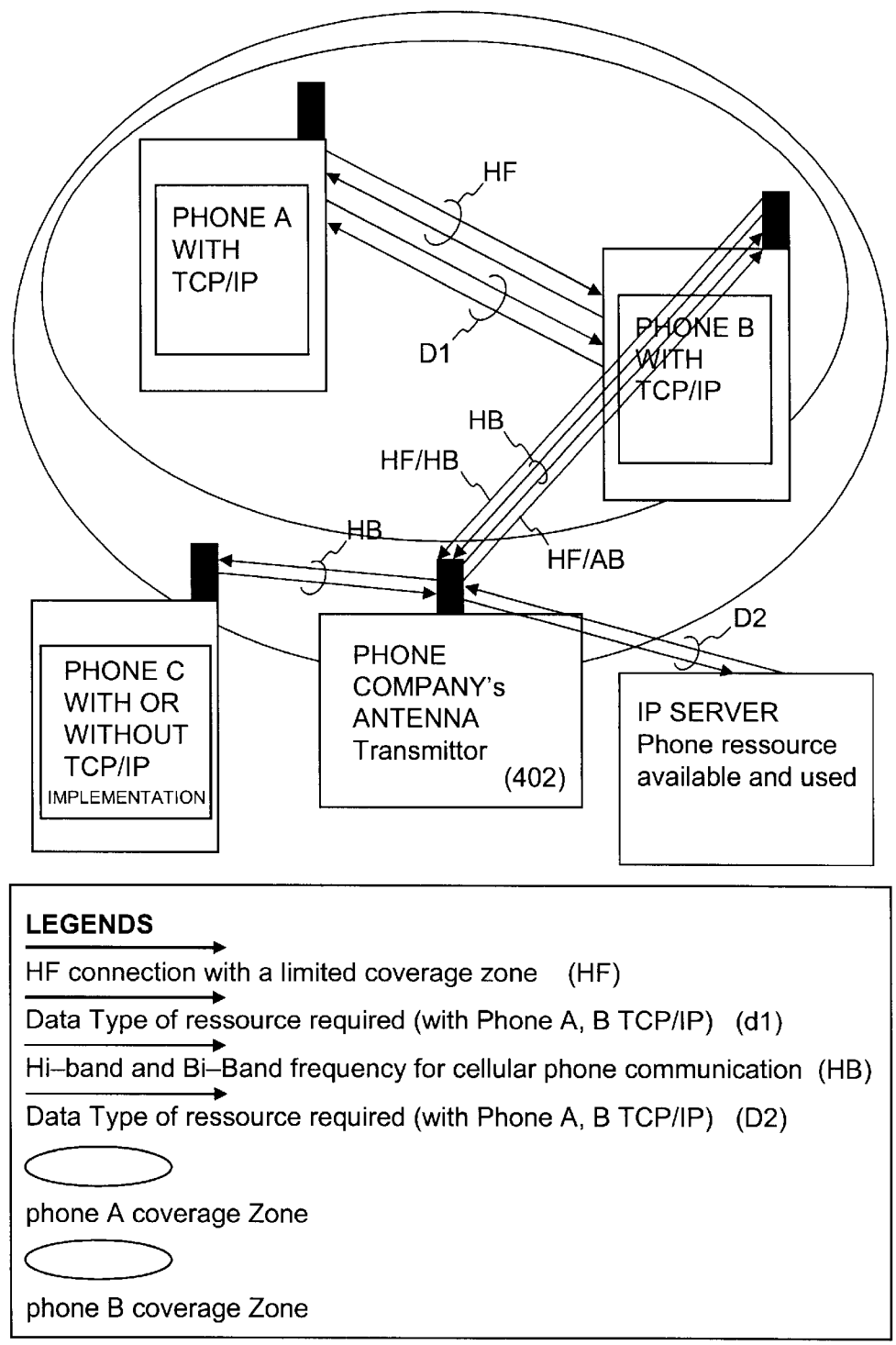
FIG. 4 is a drawing which shows how the invention is applicable to telephonic and other wireless network communications.

As discussed elsewhere hereinabove, the invention is not limited in terms of its applicability to general-purpose computers, but may, in fact, be used in any situation involving a client-server type of communication arrangement, whether through physical or wireless links. FIG. 4 illustrates how a telephone system might benefit from the application, in this case, a telecommunications arrangement utilizing TCP/IP.

The invention is applicable to any sort of machine or device which might benefit from the reduced traffic or optimization of resources made possible by the invention, including telephones, personal communications devices, personal digital assistants, and other types of workstations, whether wired or wireless. FIG. 4, for example, shows how telephones and other wireless communicators, some of which utilize a TCP/IP protocol, would operate according to the concepts introduced herein. Assume, with reference to FIG. 4, that phone A cannot be placed in direct communication with the phone company's antenna 402 when attempting to make communication with telephone C (which may, or may not, be equipped with a particular network protocol such as TCP/IP).

In such an embodiment, phone A may issue a request to any other phone located in a particular geographical area. Although, in this case, the type of communication shown in a voice communication, those of skill in the art will understand that data communications would apply in like manner. Phone B in this case acts as a resource provider for phone A, since phone B can, at least under these circumstances, be placed in direct communication with the antenna 402. Using phone B as an intermediary, then, phone A may communicate with phone C, utilizing, for example, TCP/IP between telephone A and telephone B.

It will be further be further appreciated that database management may be implemented to ensure that phone B does not have to pay for the call that phone B has placed to phone C, and, in fact, may even be given a rebate through service contract in return for agreeing to function in this way. In other words, in the event that the user's device is temporarily unavailable due to the transfer of packets on behalf of another user, the user providing the relay function might receive a busy signal for a short period of time but have a rebate on the user's next phone bill. Alternatively, the device may be equipped with sufficient multiplexing/demultiplexing capabilities that calls may proceed through a relay user's hardware without the user even knowing it, particularly if a packet-based type of protocol is used.

It will be apparent to one of skill in the art that in an area where there are large numbers of telephones or other personal communications devices adhering to the principles disclosed herein, that the need for centralized antennas, or additional antennas, may be obviated in the sense that each participant within the network may now function as an individualized movable "cell," thereby providing a new type of infrastructure not before available. This kind of capability offers a great number of flexible new surfaces, including the ability to store e-mail, voice/images not at a centralized server, but rather, distributed throughout the network so as to cut down on bandwidth while optimizing resource allocation. For example, in the case of electronic mail, if one recipient of the mail on the network received something copied to another user, that information may be cashed without the need to store the same at a centralized IP server location, thereby dramatically reducing the amount of memory and bandwidth required. Capabilities of this kind would also enable users to input names, addresses, or other locator functions without knowing beforehand what the precise IP address may be, with nodes adhering to the invention instead being utilized to interpret and make certain that the information is routed appropriately. For example, rather than addressing an e-mail recipient as jsmith@serviceprovider.com, one may simply input "Joseph R. Smith at MIT," with the system automatically generating the correct URL to ensure that information is transferred properly.

I claim:

1. A method of accessing information on a network, comprising:

designating a device on the network as a server, and a plurality of other devices as clients;

associating a database with the server to identify where desired information is stored on one or more of the other clients when a request is received from a requestor for the desired information; and if the database indicates that the information is available from one or more of the clients, providing the desired information to the requestor directly through the one or more of the clients such that the requestor is given a fastest possible access to the desired information while using minimum bandwidth of the network; and wherein, when only fragments of the information are available from one or more of the clients, the one or more of the clients are negotiated to rebuild the information such that the requestor can receive the information completely from the one or more of the clients.

2. The method as recited in claim 1, wherein the request pertains to a network address to the desired information, and the method further comprising providing the requestor with link information to the one or more of the clients so that the desired information is to be obtained from the one or more of the clients rather than from the network address.

3. The method as recited in claim 2, wherein the desired information or segmented pieces of the desired information are cached in the one or more of the clients.

4. The method as recited in claim 3, wherein the server is notified of the one or more of the clients caching the desired information of the segmented pieces of the desired information.

5. The method as recited in claim 1, wherein the link information pertains an address or addresses of the one or more of the clients that can provide the desired information alone or collectively.

6. The method as recited in claim 1, wherein the desired information is delivered to the requestor by one of a file transfer protocol or an Internet protocol (IP).

7. The method as recited in claim 1, wherein the requester is one of a computing device, a voice communicator, or a personal digital assistant.

8. The method as recited in claim 7, wherein the one or more of the clients is one of a computing device, a voice communicator, or a personal digital assistant.

9. A computer readable medium including at least computer program code for accessing information on a network, the computer readable medium comprising:

program code for designating a device on a network as a server, and a plurality of other devices as clients;

program code for associating a database with the server to identify where desired information is stored on one or more of the other clients when a request is received from a requestor for the desired information; and if the database indicates that the information is available from one or more of the clients, program code for providing the desired information to the requestor directly through the one or more of the clients such that the requester is given a fastest possible access to the desired information while using minimum bandwidth of the network; and wherein, when only fragments of the information are available from one or more of the clients, program code for negotiating with one or more of the clients to rebuild the information such that the requester can receive the information completely from the one or more of the clients.

10. The method as recited in claim 9, wherein the request pertains to a network address to the desired information, and the method further comprising program code for providing the requestor with link information to the one or more of the clients so that the desired information is to be obtained from the one or more of the clients rather than from the network address.

11. The method as recited in claim 10, wherein the desired information or segmented pieces of the desired information are cached in the one or more of the clients.

12. The method as recited in claim 11, wherein the server is notified of the one or more of the clients caching the desired information of the segmented pieces of the desired information.

13. The method as recited in claim 10, wherein the link information pertains an address or addresses of the one or more of the clients that can provide the desired information alone or collectively.

14. The method as recited in claim 10, wherein the desired information is delivered to the requestor by one of a file transfer protocol or an Internet protocol (IP).

15. The method as recited in claim 10, wherein the requestor is one of a computing device, a voice communicator, or a personal digital assistant.

16. The method as recited in claim 15, wherein the one or more of the clients is one of a computing device, a voice communicator, or a personal digital assistant.

* * * * *